United States Patent
Faure et al.

(10) Patent No.: US 8,962,713 B2
(45) Date of Patent: Feb. 24, 2015

(54) WATER-REDUCING AGENT FOR HYDRAULIC BINDERS

(75) Inventors: Jean-Michel Faure, Oullins (FR); Olivier Watt, Saint Jean de Soudain (FR); David Rinaldi, Lyon (FR); Hakimi Yahiaoui, Saint Priest (FR)

(73) Assignee: Continental Building Products LLC, Reston, VA (US)

( * ) Notice: Subject to any disclaimer, the term of this patent is extended or adjusted under 35 U.S.C. 154(b) by 248 days.

(21) Appl. No.: 13/256,331

(22) PCT Filed: Mar. 23, 2010

(86) PCT No.: PCT/IB2010/000994
§ 371 (c)(1),
(2), (4) Date: Sep. 13, 2011

(87) PCT Pub. No.: WO2010/109335
PCT Pub. Date: Sep. 30, 2010

(65) Prior Publication Data
US 2012/0016059 A1    Jan. 19, 2012

(30) Foreign Application Priority Data

Mar. 25, 2009 (FR) ..................... 09 01395
Sep. 9, 2009 (FR) ..................... 09 04295

(51) Int. Cl.
C04B 24/26 (2006.01)
C04B 24/24 (2006.01)
C04B 28/14 (2006.01)
C04B 103/40 (2006.01)
C04B 111/00 (2006.01)

(52) U.S. Cl.
CPC .............. C04B 24/246 (2013.01); C04B 28/14 (2013.01); C04B 2103/408 (2013.01); C04B 2111/0062 (2013.01)

USPC ............................................................. 524/2

(58) Field of Classification Search
USPC ............................................................. 524/2
See application file for complete search history.

(56) References Cited

U.S. PATENT DOCUMENTS

2008/0125520 A1*  5/2008  Einfeldt et al. ................ 524/5

FOREIGN PATENT DOCUMENTS

| DE | 102005022843 |   | 11/2006 |   |
|----|----|----|----|----|
| EP | 1 743 877 A1 |   | 1/2007 |   |
| EP | 1 767 504 A1 |   | 3/2007 |   |
| EP | 1851256 |   | 11/2007 |   |
| EP | 1 975 136 B1 |   | 3/2011 |   |
| FR | 2763065 |   | 11/1998 |   |
| JP | 11-079811 |   | 3/1999 |   |
| JP | 11079811 A | * | 3/1999 | ............. C04B 24/26 |
| JP | 2000-327386 |   | 11/2000 |   |
| WO | WO 94/08913 |   | 4/1994 |   |

OTHER PUBLICATIONS

English Translation of JP 11-079811. Obtained Jul. 18, 2013 at http://www19.ipdl.inpit.go.jp/PA1/cgi-bin/PA1DETAIL.*
International Search Report for PCT/IB2010/000994.

* cited by examiner

*Primary Examiner* — Ling Choi
*Assistant Examiner* — Lanee Reuther
(74) *Attorney, Agent, or Firm* — Pillsbury Winthrop Shaw & Pittman LLP

(57) ABSTRACT

A method includes using copolymers including at least polyoxyalkylenated monomer units and at least phosphorus-comprising monomer units as water-reducing agent in hydraulic binders.

9 Claims, 1 Drawing Sheet

WATER-REDUCING AGENT FOR HYDRAULIC BINDERS

CROSS-REFERENCE TO RELATED APPLICATIONS

Figure 1:
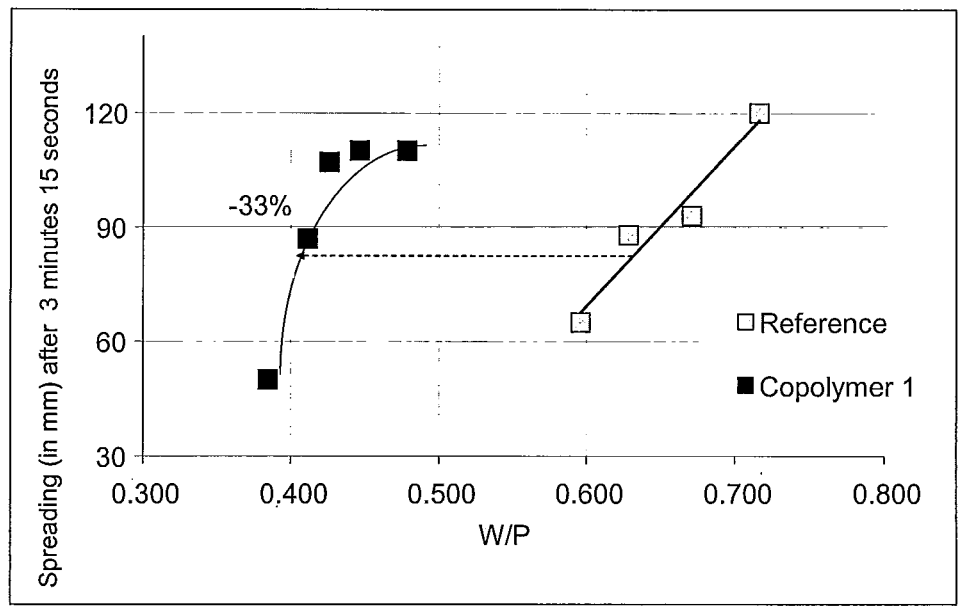

This is the U.S. National Stage of PCT/IB2010/000994, filed Mar. 23, 2010, which in turn claims priority to French Patent Application No. 0901395, filed Mar. 25, 2009 and French Patent Application No. 0904295, filed Sep. 9, 2009, the entire contents of all applications are incorporated herein by reference in their entireties.

A subject matter of the present invention is the use of a water-reducing agent in hydraulic binders, in particular hydraulic binders based on calcium sulfate.

Water-reducing agents represent today a solution in the economic move toward reducing "lost water" involved in plasterboard factories. This reduction in water has become essential in order to reduce the costs generated by the drying of the boards and to increase the production throughput. However, the processing of plaster pastes comprising less water quickly becomes difficult, indeed impossible, the viscosity strongly increasing when the water/plaster ratio decreases. Under these conditions, water-reducing agents represent, in some cases, an effective solution in order to lower this viscosity.

The water-reducing agents known to date are, for example, Poly Melamine Sulfonates (PMSs) or Poly Naphthalene Sulfonates (PNSs) which are the most widely used in factories, their economic performance being relatively low. Molecules of PCP (Poly Carboxylate Poly(oxyalkylene)) type have been developed and represent an advantageous alternative to PMSs and PNSs. However, although the effectiveness of the PCPs is greater than that of the PMSs and PNSs, the additional cost generated by their use is too high in comparison with the gain in performance obtained.

In order to meet the requirements of users, it has become necessary to find other molecules in order to fluidize plaster pastes.

Consequently, the problem which the invention intends to solve is that of providing a novel admixture suitable for fluidizing hydraulic binder compositions, in particular hydraulic binders based on calcium sulfate.

Unexpectedly, the inventors have demonstrated that it is possible to use copolymers comprising polyoxyalkylenated monomer units and phosphorus-comprising monomer units in order to obtain an admixture of use as water-reducing agent for hydraulic binders, in particular hydraulic binders based on calcium sulfate.

With this aim, the present invention provides for the use of at least one copolymer or one of its salts as water-reducing agent for hydraulic binders, said copolymer comprising at least one unit of formula (I):

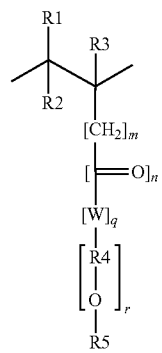

and said copolymer comprising at least one unit of formula (II):

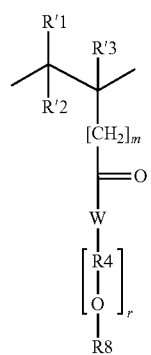

in which:

R1, R2 and R3 independently represent a hydrogen atom, a linear or branched $C_1$ to $C_{20}$ alkyl radical or a phenyl radical;

R'1, R'2 and R'3 independently represent a hydrogen atom, a linear or branched $C_1$ to $C_{20}$ alkyl radical, a phenyl radical or a —COOR9 radical with R9 independently representing a hydrogen atom, a linear or branched $C_1$ to $C_4$ alkyl radical, a monovalent, divalent or trivalent ion or a quaternary ammonium radical;

R4 represents a linear or branched $C_2$ to $C_{20}$ alkyl radical;

R5 represents a radical of formula:

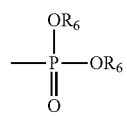

R6 independently represents a hydrogen atom, a linear or branched $C_1$ to $C_{20}$ alkyl radical, a monovalent, divalent or trivalent ion or a quaternary ammonium radical;

or also R5 represents a radical of formula:

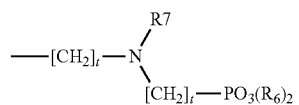

R7 represents a hydrogen atom, a linear or branched $C_1$ to $C_{18}$ alkyl radical or a radical of formula:

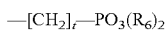
$-[CH_2]_t-PO_3(R_6)_2$ $R_8$ represents a hydrogen atom or a linear or branched $C_1$ to $C_{20}$ alkyl radical;

W independently represents an oxygen or a nitrogen atom or an NH radical;

m is an integer from 0 to 2;

n is an integer equal to 0 or 1;

q is an integer equal to 0 or 1;

r is an integer from 0 to 500;

t is an integer from 0 to 18;

the molar mass of said copolymer being from 10 000 to 400 000 daltons and said copolymer not comprising crosslinking units.

The invention also provides a hydraulic binder comprising at least said copolymer or one of its salts.

Finally, the invention provides units for the field of construction, obtained from a hydraulic binder comprising at least said copolymer or one of its salts.

An advantage of the invention is that the water-reducing agent used according to the invention makes it possible to formulate plaster pastes while using reduced amounts of water with respect to the amounts conventionally used.

Another advantage of the invention is that the water-reducing agent used according to the invention makes it possible to reduce the water involved in the factories which is necessary for the manufacture of plasterboards.

Furthermore, the water-reducing agent used according to the invention exhibits the advantage of not or only slightly slowing down the hydration of the hydraulic binders and in particular of the hydraulic binders based on partially anhydrous or completely anhydrous calcium sulfate.

Another advantage of the present invention is the absence or the virtual absence of residual formaldehyde, which is not the case for PMSs or PNSs.

Another advantage of the present invention is that the water-reducing agent used according to the invention makes it possible to control the fluidity of the plaster pastes without modifying the other properties thereof.

Another advantage of the invention is that the water-reducing agent used according to the invention makes it possible to fluidize equally well plasters resulting from natural gypsum or from synthetic gypsum.

Finally, the invention has the advantage of being able to be employed in any industry, in particular the building industry, the chemical industry (admixture producers), in all the construction markets (building, civil engineering or prefabrication factory) and in the plaster unit construction industry.

Other advantages and characteristics of the invention will become clearly apparent on reading the description and examples, given purely by way of illustration and without implied limitation, which will follow.

The term "admixture" is understood to mean, according to the present invention, any compound which, incorporated in a formulation, makes it possible to contribute specific properties.

The term "binder" is understood to mean, according to the present invention, any compound having the property of contributing cohesion to the formulation in which it is incorporated and which makes it possible to contribute mechanical characteristics to said formulation (for example, compressive strength, tensile strength, adhesion). This binder may also be intended to bind inert components, such as aggregates.

The expression "hydraulic binders" is understood to mean, according to the present invention, any compound having the property of becoming hydrated in the presence of water and the hydration of which makes it possible to obtain a solid having mechanical characteristics. The hydraulic binder according to the invention can in particular be a binder based on calcium sulfate or a cement. Preferably, the hydraulic binder according to the invention is a binder based on calcium sulfate.

The expression "hydraulic binders based on calcium sulfate" is understood to mean, according to the invention, hydraulic binders based on partially anhydrous or completely anhydrous calcium sulfate.

By the following terms:

gypsum or calcium sulfate hydrate is understood to mean, according to the present invention: $CaSO_4.2(H_2O)$;

plaster or calcium sulfate hemihydrate or calcium sulfate semihydrate or partially anhydrous calcium sulfate is understood to mean, according to the present invention: $CaSO_4.0.5H_2O$;

anhydrous calcium sulfate or anhydrite (type II or type III) or completely anhydrous calcium sulfate is understood to mean, according to the present invention: $CaSO_4$.

The expression "plaster paste" is understood to mean, according to the present invention, a mixture of water and of plaster, which may or may not be foamed, and optionally of other compounds (for example, fillers, admixtures and the like). The expression "plaster paste" also denotes grouts or mortars.

The expression "copolymer" is understood to mean, according to the invention, a polymer comprising the repetition of at least 2, indeed even more, distinct monomer units. Thus, a copolymer according to the invention can comprise the repetition of 3 distinct monomer units.

The expression "crosslinking unit" is understood to mean, according to the invention, a unit comprising at least two functional groups which have polymerized to result in the crosslinking of the polymer chains.

The expression "setting" is understood to mean, according to the invention, the change to the solid state by a chemical reaction.

The expression "water-reducing agent" is understood to mean, according to the present invention, any admixture which makes it possible to fluidize.

The expression "units for the field of construction" is understood to mean, according to the present invention, any constituent unit of a structure, such as, for example, a plasterboard, a floor, a screed, a wall, a partition, including an inner partition, an acoustic or thermal lining, a ceiling, a beam or girder, a worktop, a cornice, a coating, a spray plaster, medical plasters, molds for casting metals or figurines, or "industrial" plasters.

The invention relates to the use of at least one copolymer or one of its salts as water-reducing agent for hydraulic binders, said copolymer comprising at least one unit of formula (I):

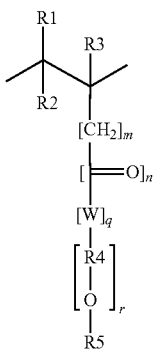

(I)

and said copolymer comprising at least one unit of formula (II):

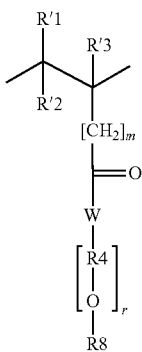

(II)

in which:
R1, R2 and R3 independently represent a hydrogen atom, a linear or branched $C_1$ to $C_{20}$ alkyl radical or a phenyl radical;
R'1, R'2 and R'3 independently represent a hydrogen atom, a linear or branched $C_1$ to $C_{20}$ alkyl radical, a phenyl radical or a —COOR9 radical with R9 independently representing a hydrogen atom, a linear or branched $C_1$ to $C_4$ alkyl radical, a monovalent, divalent or trivalent ion or a quaternary ammonium radical;
R4 represents a linear or branched $C_2$ to $C_{20}$ alkyl radical;
R5 represents a radical of formula:

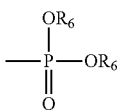

R6 independently represents a hydrogen atom, a linear or branched $C_1$ to $C_{20}$ alkyl radical, a monovalent, divalent or trivalent ion or a quaternary ammonium radical; or also R5 represents a radical of formula:

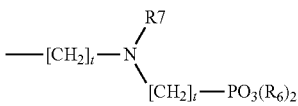

R7 represents a hydrogen atom, a linear or branched $C_1$ to $C_{18}$ alkyl radical or a radical of formula:

—[CH$_2$]$_t$—PO$_3$(R$_6$)$_2$ $R_8$ represents a hydrogen atom or a linear or branched $C_1$ to $C_{20}$ alkyl radical;
W independently represents an oxygen or a nitrogen atom or an NH radical;
m is an integer from 0 to 2;
n is an integer equal to 0 or 1;
q is an integer equal to 0 or 1;
r is an integer from 0 to 500;
t is an integer from 0 to 18;
the molar mass of said copolymer being from 10 000 to 400 000 daltons and said copolymer not comprising crosslinking units.

It is clear that the integer m of the unit (I) and the integer m of the unit (II) are independent and can be identical or different. The same principle also applies to the integers q and r.

The copolymer according to the invention is not a crosslinked polymer obtained by use of crosslinking monomers.

It is clear that the integers t of the R5 radical of the unit (I) can be identical or different.

It is clear that W of the unit (I) and W of the unit (II) are independent and can be identical or different. The same principle also applies for R4.

Preferably, the copolymer used according to the invention or one of its salts has an R1 radical representing a hydrogen atom.

Preferably, the copolymer used according to the invention or one of its salts has an R2 radical representing a hydrogen atom.

Preferably, the copolymer used according to the invention or one of its salts has an R3 radical representing a methyl radical.

Preferably, the copolymer used according to the invention or one of its salts has an R4 radical representing an ethyl radical.

Preferably; the copolymer according to the invention or one of its salts has an R5 radical representing a radical of formula:

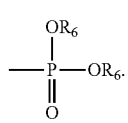

Preferably, the copolymer used according to the invention or one of its salts has an R6 radical representing a hydrogen atom.

Preferably, the copolymer used according to the invention or one of its salts has an R8 radical representing a hydrogen atom or a methyl radical.

Preferably, the copolymer used according to the invention or one of its salts has an atom W representing an oxygen atom.

Preferably, the copolymer used according to the invention or one of its salts has an integer r from 1 to 300, preferably from 20 to 250, more preferably from 40 to 200 and more preferably still from 40 to 150.

According to an alternative form of the invention, the copolymer used according to the invention can comprise at least one unit of formula (I) as described above, at least one unit of formula (II) as described above and at least one other monomer unit, known as unit (III), in addition to the units of formulae (I) and (II).

The unit (III) can originate from a monomer chosen from different types of molecules and in particular chosen from the following examples:

unsaturated monomers of monocarboxylic or dicarboxylic acid, such as acrylic acid, methacrylic acid, maleic acid, maleic anhydride, fumaric acid, itaconic acid, itaconic anhydride or citraconic acid, and their salts of monovalent or divalent metals, quaternary ammonium or organic amines;

esters and diesters of the abovementioned unsaturated monomers of monocarboxylic or dicarboxylic acid having an alcohol functional group having from 1 to 30 carbon atoms;

amides and diamides of the abovementioned unsaturated monomers of monocarboxylic or dicarboxylic acid having an amine functional group having from 1 to 30 carbon atoms;

esters and diesters of the abovementioned unsaturated monomers of monocarboxylic or dicarboxylic acid having an alkoxy(poly(alkylene glycol)s) functional group obtained by addition of from 1 to 500 mol of alkylene oxide having from 2 to 18 carbon atoms to the abovementioned alcohols and amines;

esters and diesters of the abovementioned unsaturated monomers of monocarboxylic or dicarboxylic acid having a glycol functional group possessing from 2 to 18 carbon atoms or possessing from 2 to 500 poly(alkylene glycol)s as molar addition number of the preceding glycols;

unsaturated sulfonic acids, such as vinylsulfonate, (meth)allylsulfonate, 2-(meth)-acryloxyethylsulfonate, 3-(meth)acryloxypropylsulfonate, 3-(meth)acryloxy-2-hydroxy-propylsulfonate, 3-(meth)acryloxy-2-hydroxypropyl sulfophenyl ether, 3-(meth)acryloxy-2-hydroxypropyloxysulfobenzoate, 4-(meth)acryloxybutylsulfonate, (meth)acrylamidomethylsulfonic acid, (meth)acrylamidoethylsulfonic acid, 2-methylpropanesulfonic acid (meth)acrylamide and styrenesulfonic acid, or their salts of monovalent or divalent metals, quaternary ammonium or organic amines;

vinylaromatic compounds, such as styrene, α-methylstyrene, vinyltoluene and p-methylstyrene;

alkanediol mono(meth)acrylates such as 1,4-butanediol mono(meth)acrylate, 1,5-pentanediol mono(meth)acrylate and 1,6-hexanediol mono(meth)acrylate;

dienes, such as butadiene, isoprene, 2-methyl-1,3-butadiene and 2-chloro-1,3-butadiene;

unsaturated amides, such as (meth)acrylamide, (meth)acrylalkylamide, N-methylol(meth)acrylamide and N,N-dimethyl(meth)acrylamide;

unsaturated cyano compounds, such as (meth)acrylonitrile and α-chloro-acrylonitrile;

unsaturated esters, such as vinyl acetate and vinyl propionate;

unsaturated amines, such as aminoethyl(meth)acrylate, methylaminoethyl(meth)acrylate, dimethylaminoethyl (meth)acrylate, dimethylaminopropyl(meth)acrylate, dibutylaminoethyl(meth)acrylate and vinylpyridine;

divinylaromatic compounds, such as divinylbenzene;

cyanurates, such as triallyl cyanurate;

allyl compounds, such as (meth)allyl alcohol and glycidyl (meth)allyl ether;

silanes;

siloxane derivatives, such as:
polydimethylsiloxanepropylaminomaleamic acid,
polydimethylsiloxaneaminopropyleneaminomaleamic acid,
polydimethylsiloxanebis(propylaminomaleamic acid),
polydimethylsiloxanebis(dipropyleneaminomaleamic acid),
polydimethylsiloxane-(1-propyl-3-acrylate),
polydimethylsiloxane-(1-propyl-3-methacrylate),
polydimethylsiloxane-bis-(1-propyl-3-acrylate),
polydimethylsiloxane-bis-(1-propyl-3-methacrylate);

silyl derivatives, such as:
3-(trimethoxysilyl)propyl methacrylate,
3-[tris(trimethylsiloxy)silyl]propyl methacrylate,
3-(triethoxysilyl)propyl methacrylate,
3-[tris(triethylsiloxy)silyl]propyl methacrylate,
3-(trimethoxysilyl)propyl acrylate,
3-[tris(trimethylsiloxy)silyl]propyl acrylate,
3-(triethoxysilyl)propyl acrylate,
3-[tris(triethylsiloxy)silyl]propyl acrylate;

groups of formula —Si(R)$_x$(OR)$_y$, in which R are alkyl groups, preferably $C_1$ to $C_6$ alkyl groups, x is an integer from 0 to 2 and y is an integer from 1 to 3, the sum of x and y being equal to 3 in order to satisfy the valency of the silicon.

According to a preferred alternative form of the invention, the copolymer used according to the invention can comprise at least one unit of formula (I), at least one unit of formula (II) and at least one unit (III) chosen from unsaturated sulfonic acids, such as vinylsulfonate, (meth)allylsulfonate, 2-(meth)acryloxyethylsulfonate, 3-(meth)acryloxy-propylsulfonate, 3-(meth)acryloxy-2-hydroxypropylsulfonate, 3-(meth)acryloxy-2-hydroxypropyl sulfophenyl ether, 3-(meth)acryloxy-2-hydroxypropyloxysulfobenzoate, 4-(meth)acryloxybutylsulfonate, (meth)acrylamidomethylsulfonic acid, (meth)acrylamido-ethylsulfonic acid, 2-methylpropanesulfonic acid (meth)acrylamide or styrenesulfonic acid, or their salts of monovalent or divalent metals, quaternary ammonium or organic amines.

According to another preferred alternative form of the invention, the copolymer used according to the invention can comprise at least one unit of formula (I), at least one unit of formula (II) and at least one unit (III), said unit (III) being chosen from unsaturated carboxylic acids, such as unsaturated monomers of monocarboxylic or dicarboxylic acid, such as acrylic acid, methacrylic acid, maleic acid, maleic anhydride, fumaric acid, itaconic acid, itaconic anhydride or citraonic acid, and their salts of monovalent or divalent metals, quaternary ammonium or organic amines. According to this alternative form, the preferred unit (III) is methacrylic acid.

According to another alternative form of the invention, the copolymer used according to the invention can comprise at least one unit of formula (II), at least one unit of formula (I) having an R5 radical either of formula

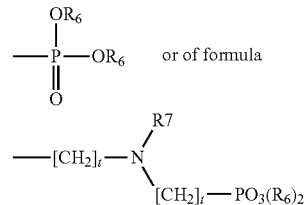

and at least one unit (III).

The unit (III) can be chosen from those mentioned above.

The copolymer used according to the invention does not comprise crosslinking units.

Preferably, the copolymer used according to the invention does not comprise units originating from monomers chosen from the following examples:

(poly)alkylene glycol di(meth)acrylates such as triethylene glycol di(meth)-acrylate, (poly)ethylene glycol di(meth)acrylate, polypropylene glycol di(meth)acrylate and (poly)ethylene glycol (poly)propylene glycol di(meth)acrylate;

multifunctional (meth)acrylates, such as hexanediol di(meth)acrylate, trimethylol-propane tri(meth)acrylate and trimethylolpropane di(meth)acrylate;

(poly)alkylene glycol dimaleates, such as triethylene glycol dimaleate and poly-ethylene glycol dimaleate.

Preferably, the copolymer used according to the invention does not comprise units originating from monomers chosen from the following examples:

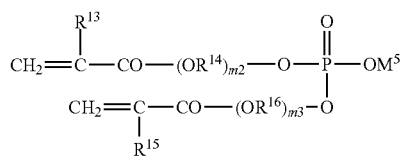

with $R^{13}$, $R^{14}$, $R^{15}$, $R^{16}$, $M^5$, m2 and m3 as defined in the application EP 1 975 136.

The copolymer according to the invention or one of its salts can be used as water-reducing agent, in particular as water-reducing agent for cements or hydraulic binders based on calcium sulfate.

More particularly, the copolymer used according to the invention will make it possible to formulate plaster pastes comprising less water and to control the fluidity of said paste.

In particular, the copolymer according to the invention or one of its salts can be used as water-reducing agent for hydraulic binders based on calcium sulfate chosen from partially anhydrous or completely anhydrous calcium sulfates. Among hydraulic binders based on calcium sulfate, plasters based on calcium sulfate hemihydrate (α or β or a mixture of the two) are very particularly suitable according to the invention.

More particularly, the copolymer according to the invention or one of its salts can be used as water-reducing agent for hydraulic binders based on calcium sulfate chosen from plasters based on calcium sulfate hemihydrate (α or β or a mixture of the two) or binders based on anhydrous calcium sulfate.

Advantageously, the copolymer according to the invention or one of its salts can be used as water-reducing agent for plasters resulting from natural or synthetic gypsum. Mention may in particular be made, among natural gypsums, of selenite, alabaster, fibrous gypsum, saccharoidal gypsum, marine gypsum or gypsum flower. Mention may be made, among synthetic gypsums, of desulfurization gypsum, phosphogypsum (gypsum resulting from the manufacture of phosphoric acid), titanogypsum (gypsum resulting from the neutralization of sulfuric acid produced during the process for the synthesis of titanium dioxide), citrogypsum (gypsum resulting from the manufacture of citric acid), tartarogypsum (gypsum resulting from the manufacture of tartaric acid), borogypsum (gypsum resulting from the manufacture of boric acid) or lactogypsum (gypsum resulting from the manufacture of lactic acid).

Advantageously, the copolymer according to the invention or one of its salts can be used as water-reducing agent for plasters based on calcium sulfate hemihydrate which may or many not comprise impurities, such as, for example, clay.

The copolymer according to the invention or one of its salts can exhibit a varied chemical structure. In particular, the distribution of the units (I) and (II) or the units (I) and (II) and (III) within the copolymer can vary from one molecule to another. In particular, the copolymer according to the invention can exhibit a block, random, alternating or gradient structure.

Block structure is understood to mean, according to the invention, a structure comprising separate blocks of each of the monomer units.

Random structure is understood to mean, according to the invention, a structure comprising the monomer units distributed randomly or statistically in the polymer chain.

Alternating structure is understood to mean, according to the invention, a structure where the monomer units alternate in the polymer chain.

Gradient structure is understood to mean, according to the invention, a structure where the concentration of each monomer unit varies in an inversely proportional fashion with respect to one another.

Preferably, the copolymer used according to the invention will exhibit a random or gradient structure.

More preferably still, the copolymer used according to the invention will exhibit a random structure.

Preferably, the copolymer according to the invention can comprise:
 from 1 to 99% of units (I), preferably from 2 to 98% and more preferably still from 3 to 97%;
 from 1 to 99% of units (II), preferably from 2 to 90% and more preferably still from 3 to 70%;
 from 0 to 98% of unit (III);
 the percentages being expressed as number of unit entities with respect to the total number of units present in the copolymer.

More preferably, the copolymer according to the invention can comprise:
 from 20 to 80% of units (I);
 from 5 to 35% of units (II);
 from 20 to 60% of unit (III);
 the percentages being expressed as number of unit entities with respect to the total number of units present in the copolymer.

More preferably still, the copolymer according to the invention can comprise:
 40% of units (I);
 20% of units (II);
 40% of unit (III);
 the percentages being expressed as number of unit entities with respect to the total number of units present in the copolymer.

The copolymer used according to the invention or one of its salts has a molar mass from 10 000 to 400 000 daltons, more particularly from 15 000 to 250 000 daltons, preferably from 20 000 to 150 000 daltons and more preferably from 20 000 to 100 000 daltons.

The copolymer used according to the invention can be provided in the salt form or in the acid form, in all or in part. The salts or the ions suitable according to the invention can be chosen from the metals as described in the Periodic Table of the Elements, in particular alkali metals or alkaline earth metals. Other metals, such as transition metals, may also be suitable.

The copolymers are obtained by copolymerization, preferably of radical type, of appropriate monomers. The copolymerization can be carried out in a way conventional to a person skilled in the art.

The copolymers according to the invention can also be obtained by post-grafting, such as by post-esterification or post-amidation, the main chain, such as, for example, by post-grafting maleic acid functional group.

According to an alternative form of the invention, the copolymer according to the invention is produced from monomers (I) of following formula:

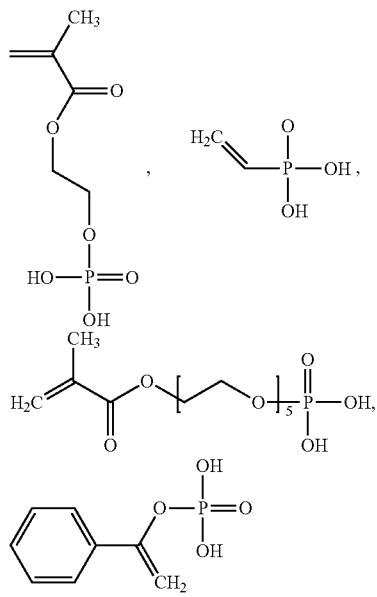

More preferably still, the copolymer according to the invention is produced from monomers (II) of following formulae:

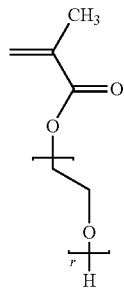

According to another alternative form of the invention, the copolymer according to the invention is produced from monomers (III) of following formulae:

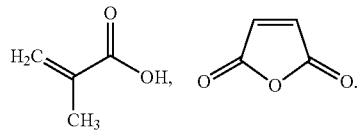

The concentration of copolymer used according to the invention in the formulation depends on the targeted application. The copolymer according to the invention can be used in the form of a liquid solution, for example an aqueous solution, in the form of a dispersion, in the form of an emulsion or also in the form of a powder. Preferably, the copolymer according to the invention or one of its salts will be used at a concentration from 0.001 to 10%, preferably from 0.01 to 2%, more preferably from 0.01 to 1% and more preferably still from 0.01 to 0.5%, as dry weight of copolymer, with respect to the dry weight of hydraulic binder.

Finally, the copolymer used according to the invention can be used, alone or in combination with one or more other admixtures, such as an accelerator, retarder, thickener, rheological agent, inorganic filler (for example, calcium carbonate, gypsum, and the like), impurity inertant (for example, clay inertants) or optionally another water-reducing agent, in order to adjust the rheological and setting properties of the material.

Advantageously, the copolymer used according to the invention can be used to fluidize plaster pastes comprising a retarder or an accelerator of the setting of the plaster.

Advantageously, the copolymer used according to the invention can be used to fluidize plaster pastes whatever the rheology of the latter, that is to say whether the plaster paste is liquid, semiliquid, semisolid or plastic, or foamed or non-foamed.

Another subject matter of the invention is a hydraulic binder comprising at least one copolymer or one of its salts according to the invention. More particularly, a subject matter of the invention is a hydraulic binder based on calcium sulfate comprising at least one copolymer or one of its salts according to the invention.

The copolymer used according to the invention or one of its salts can be incorporated in the hydraulic binder in the form of a liquid solution, in the form of a dispersion, in the form of an emulsion or also in the form of a powder.

The hydraulic binder according to the invention can be used for the manufacture of units in the field of construction, in particular for any constituent unit of a structure, such as, for example, a plasterboard, a floor, a screed, a wall, a partition, including an inner partition, an acoustic or thermal lining, a ceiling, a beam or girder, a worktop, a cornice, a coating or a spray plaster.

The hydraulic binder according to the invention can be used in the manufacture of units for the field of construction, more particularly in the manufacture of plasterboards.

The copolymer used according to the invention or one of its salts can be incorporated in the hydraulic binder during the manufacture of the plasterboards, that is to say in the factory during the inline process for the manufacture of the plasterboards.

The manufacture of plasterboards and more particularly of plasterboards exhibiting a gypsum core having a density which changes as a function of the distance with respect to the surface is known. It is known to produce plasterboards exhibiting a core layer of low density by incorporating foaming agents in the paste. This core layer is sandwiched by high-density surface layers. The surface plaster layers are integral with sheets of board, the facing. Generally, the device for manufacturing this type of plasterboard comprises:

means for introducing a facing,
a first mixer for the preparation of a first plaster paste,
means for applying the first plaster paste to a facing,
means for spreading this first plaster paste as a crude surface layer over the facing,
a second mixer for the preparation of a second plaster paste,
means for applying the second plaster paste to the crude surface layer,
means for spreading this second plaster paste as a crude core layer over the crude surface layer,
means for shaping a plasterboard,
a third mixer for the preparation of a third plaster paste,
means for introducing a second facing, means for applying the third plaster paste above the second facing, means for turning over the second facing, means for spreading as a second crude surface layer, means for applying the second crude surface layer to the crude core layer, means for carrying away the facing and crude layers.

The copolymer or one of its salts used as water-reducing agent according to the invention in this device can be incorporated directly in the starting materials before they arrive in the mixers, whatever the form may be (individually, as a mixture or as a premix), or also can be incorporated in the plaster paste present in the mixers.

The concentration of copolymer according to the invention in, for example, a plaster paste depends on the targeted application. Preferably, the copolymer according to the invention or one of its salts will be used at a concentration from 0.001 to 10%, preferably from 0.01 to 2%, more preferably from 0.01 to 1% and more preferably still from 0.01 to 0.5%, as dry weight of copolymer, with respect to the weight of the plaster paste.

Another subject matter of the invention is a hydraulic binder comprising at least one copolymer or one of its salts according to the invention.

Another subject matter of the invention is also units for the field of construction obtained from a hydraulic binder comprising at least one copolymer or one of its salts according to the invention.

FIG. 1 represents the water-reducing power.

Figure 2:
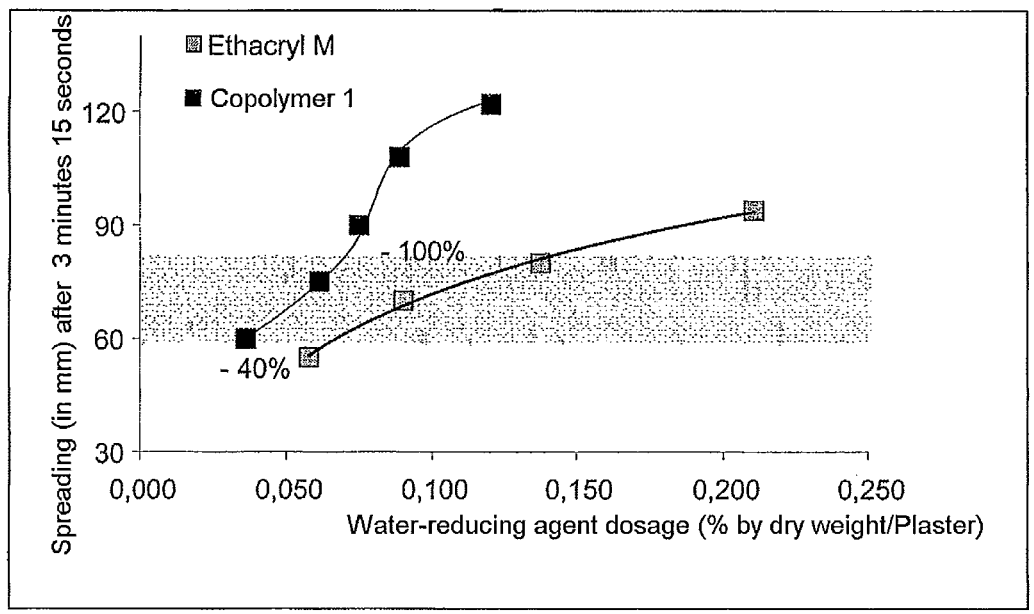

FIG. 2 presents the evaluation of the fluidizing power of a copolymer according to the invention in comparison with Ethacryl M.

The following examples illustrate the invention without limiting the scope thereof.

EXAMPLES

Example 1

Synthesis of a Copolymer According to the Invention (Copolymer 1)

The following reactants are weighed into a jacketed 100 ml reactor:

2.88 g of EGMP (ethylene glycol methacrylate phosphate, Aldrich) of following formula:

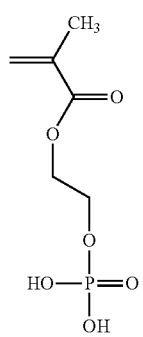

28.54 g of MA-5000 (Clariant, 60 weight % aqueous solution) of following formula:

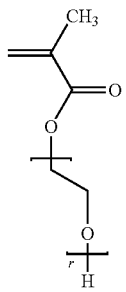

with r=110

0.25 g of thioglycolic acid (which represents 15 mol %).

A reaction installation is set up which comprises a mechanical stirrer, a reflux condenser, a nitrogen inlet, a temperature probe and the jacketed reactor. The reaction medium is degassed under nitrogen and is heated to 80° C. using the jacket. After reaching the setpoint temperature and sufficient degassing (approximately 15 minutes), 0.05 g of vazo68WSP (thermal initiator from DuPont) in the powder form is added. The medium is left to react at 80° C. for 2 h.

A solution of copolymer 1 is thus obtained. It is allowed to cool and then neutralized with 1.1 g of NaOH pellets. A clear colorless aqueous solution is obtained, the pH of which is equal to 6.

The weight-average molar mass of the copolymer 1 obtained is 40 000 daltons (Mw). It was evaluated by aqueous-phase steric exclusion chromatography (SEC) using a POE calibration. The copolymer 1 includes, on average, 20% of MA-5000 units and 80% of EGMP units.

Example 2

Synthesis of a Copolymer According to the Invention (Copolymer 2)

The following reactants are weighed into a jacketed 250 ml reactor:

4.8 g of PAM 100® (Rhodia) of following formula:

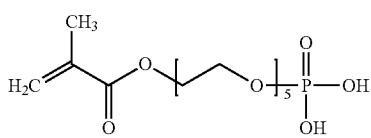

42.86 g of MA-5000 (Clariant, 70 weight % aqueous solution) 25

1.03 g of methacrylic acid (Aldrich)

120 g of faucet water 4.1 g of thioglycolic acid (Aldrich) as a 10% solution in water.

A reaction installation is set up which comprises a mechanical stirrer, a reflux condenser, a nitrogen inlet, a temperature probe and the jacketed reactor. The reaction medium is degassed under nitrogen and is heated to 65° C. using an oil bath. After reaching the setpoint temperature and sufficient degassing (approximately 15 minutes), 2.52 g of a 10% solution of V50 (thermal initiator from DuPont) are added. The medium is left to react at 65° C. for 2 h. The product can be neutralized using a 50% sodium hydroxide solution in order to obtain a pH equal to 6.

The weight-average molar mass of the copolymer 2 obtained is 30 000 daltons (Mw). It was evaluated by aqueous-phase steric exclusion chromatography (SEC) using a POE calibration. The copolymer 2 includes, on average, 20% of MA-5000 units, 40% of PAM 100 units and 40% of methacrylic units, % by number of units in the copolymer.

A solution of copolymer 2 is thus obtained. The formula of copolymer 2 is as follows:

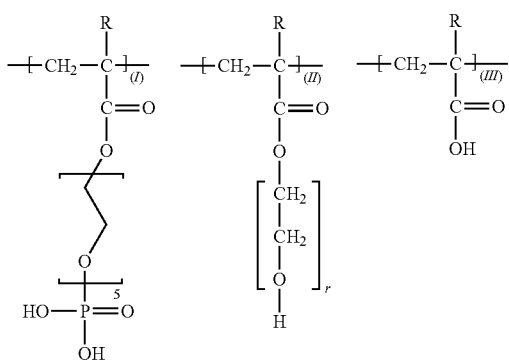

with 40% of unit (I), 20% of unit (II) and 40% of unit (III), and with r=110.

Example 2a

Synthesis of a Copolymer According to the Invention (Copolymer 2a)

The following reactants are weighed into a jacketed 250 ml reactor:
6.4 g of PAM 100® (Rhodia) of following formula:

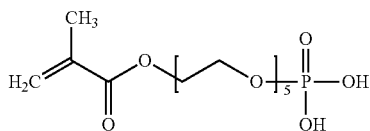

57.14 g of MA-5000 (Clariant, 70 weight % aqueous solution)
1.38 g of methacrylic acid (Aldrich)
120 g of faucet water
0.73 g of pentaerythritol tetra(3-mercaptopropionate) (CAS 7575-23-7).

A reaction installation is set up which comprises a mechanical stirrer, a reflux condenser, a nitrogen inlet, a temperature probe and the jacketed reactor. The reaction medium is degassed under nitrogen and is heated to 65° C. using an oil bath. After reaching the setpoint temperature and sufficient degassing (approximately 15 minutes), 3.25 g of a 10% solution of V50 (thermal initiator from DuPont) are added. The medium is left to react at 65° C. for 2 h. The product can be neutralized using a 50% sodium hydroxide solution in order to obtain a pH equal to 6.

The weight-average molar mass of the copolymer 2a obtained is 30 000 daltons (Mw). It was evaluated by aqueous-phase steric exclusion chromatography (SEC) using a POE calibration. The copolymer 2a includes, on average, 20% of MA-5000 units, 40% of PAM 100 units and 40% of methacrylic units, % by number of units in the copolymer.

A solution of copolymer 2a is thus obtained. It is a star polymer.

Example 3

Synthesis of a Copolymer According to the Invention (Copolymer 3)

The following reactants are weighed into a jacketed 250 ml reactor:
5.04 g of EGMP (Aldrich)
42.86 g of MA-5000 (Clariant, 70 weight % aqueous solution)
100 g of faucet water
4.1 g of thioglycolic acid (Aldrich) as a 10% solution in water (which represents 15 mol % of monomer).

The installation and the procedure are the same as in example 2.

The weight-average molar mass of the copolymer 3 obtained is 30 000 daltons (Mw). It was evaluated by aqueous-phase steric exclusion chromatography (SEC) using a POE calibration. The copolymer 3 includes, on average, 20% of MA-5000 units and 80% of EGMP units, % by number of units in the copolymer.

Example 4

Synthesis of a Copolymer According to the Invention (Copolymer 4)

The following reactants are weighed into a jacketed 250 ml reactor:
2.52 g of EGMP
42.86 g of MA-5000 (Clariant, 70 weight % aqueous solution)
2.95 g of sulfopropyl methacrylate (SPM) (Aldrich) of following formula:

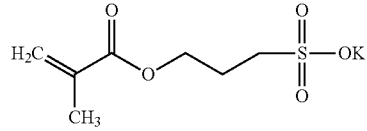

100 g of faucet water
4.1 g of thioglycolic acid (Aldrich) as a 10% solution in water (which represents 15 mol % of monomer).

The installation and the procedure are the same as in example 2.

The weight-average molar mass of the copolymer 4 obtained is 30 000 daltons (Mw). It was evaluated by aqueous-phase steric exclusion chromatography (SEC) using a POE calibration. The copolymer 4 includes, on average, 20% of MA-5000 units, 40% of EGMP units and 40% of SPM units, % by number of units in the copolymer.

Example 5

Synthesis of a PCP (Copolymer 5)

The following reactants are weighed into a jacketed 250 ml reactor:
42.86 g of MA-5000 (Clariant, 70 weight % aqueous solution)
2.06 g of methacrylic acid
100 g of faucet water 4.1 g of thioglycolic acid (Aldrich) as a 10% solution in water (which represents 15 mol % of monomer).

The installation and the procedure are the same as in example 2.

The weight-average molar mass of the copolymer 5 obtained is 30 000 daltons (Mw). It was evaluated by aqueous-phase steric exclusion chromatography (SEC) using a POE calibration. The copolymer 5 includes, on average, 20% of MA-5000 units and 80% of methacrylic units, % by number of units in the copolymer.

Example 6

Evaluation of the Water-Reducing Power of Copolymer 1 on Liquid Calcium Sulfate Hemihydrate Paste The fluidity of the liquid paste is evaluated by means of the "spreading ring" test. A cylinder (also referred to as spreading ring) of well defined size (width 30 mm-height 50 mm) is positioned on the worktop, so that the volume delimited by the interior of the cylinder and the worktop forms a cavity. This cavity is completely filled with test liquid paste. The cylinder is then carefully raised. The test liquid paste then spreads out over the worktop. The spreading surface area of the test liquid paste is determined.

The fluidizing effect of copolymer 1 is evaluated on a liquid calcium sulfate hemihydrate paste mixed at a given water/plaster (W/P) ratio.

The water, the amount of set-retarder (0.05%, % by dry weight) and the amount of solids content of copolymer 1 are weighed into a plastic bowl. The hemihydrate is weighed (100 g) into another bowl. The amounts of water and of copolymer 1 solution depend on the W/P ratio and the dosage desired for the test. At time zero, the hemihydrate is gently added to the water comprising copolymer 1 as admixture. After a contact time of 1 minute 30 seconds, a first mixing lasting 30 seconds is carried out with the sampling spoon. The grout is left to stand for 30 seconds before a second mixing lasting 30 seconds. On completion of this second mixing, the fluidity of the grout is evaluated by the spreading ring test described above.

The water-reducing power of copolymer 1 is compared with the admixture-free reference grout (FIG. 1). For this series of tests, the dosage of copolymer 1 is unvarying (0.085%/natural origin Selecta plaster, Lafarge; % by dry weight of copolymer) but the amount of water of the test (thus the W/P) is variable. The results are presented in FIG. 1.

At this dosage, the water-reducing power is approximately 35% for a spreading of 90 mm.

The results show a better spreading of the liquid paste in the presence of copolymer 1 according to the invention compared with the admixture-free liquid paste. The liquid paste is much more fluid using copolymer 1.

Example 7

Evaluation of the Water-Reducing Power of Copolymers 1, 2, 2a, 3 and 4 and of Two PCPs on Liquid Synthetic Calcium Sulfate Hemihydrate Paste The fluidity of the liquid paste is evaluated in the same way as above in example 6 but with a Schmitt ring with a width of 60 mm and a height of 50 mm.

With 0.1% of active material at W/P=0.5, synthetic Lippendorf plaster

|  | Spreading in mm (synthetic Lippendorf plaster) |
|---|---|
| Copolymer 1 | 118 |
| Copolymer 2 | 165 |
| Copolymer 2a | 160 |
| Copolymer 3 | 140 |
| Copolymer 4 | 150 |
| Copolymer 5 (PCP) | 80 |
| Ethacryl M (PCP, Lyondell) | 115 |

Example 8

Evaluation of the Water-Reducing Power of Copolymers 1, 2, 3 and 4 and of Two PCPs on Liquid Natural Calcium Sulfate Hemihydrate Paste The fluidity of the liquid paste is evaluated in the same way as above in example 6 but with a Schmitt ring with a width of 60 mm and a height of 50 mm.

With 0.1% of active material at W/P=0.5, Selecta natural plaster

|  | Spreading in mm (Selecta natural plaster) |
|---|---|
| Copolymer 1 | 165 |
| Copolymer 2 | 160 |
| Copolymer 3 | 170 |
| Copolymer 4 | 145 |
| Copolymer 5 (PCP) | 75 |
| Ethacryl M (PCP, Lyondell) | 100 |

Example 9

Evaluation of the Fluidizing Effect of Copolymer 1 on Liquid Natural Calcium Sulfate Hemihydrate Paste The fluidizing power of copolymer 1 according to the invention is measured in comparison with a known water-reducing agent. Copolymer 1 according to the invention resulting from example 1 is tested in comparison with a commercial water-reducing agent (Ethacryl M, supplied by Lyondell). The weight-average molar mass of this polymer is 30 000 daltons (Mw) and was evaluated by aqueous SEC using a POE calibration. The plaster is a β plaster of natural origin, SELECTA. The water/plaster ratio is unvarying (W/P=0.46).

The results are presented in FIG. 2.

The results show a better spreading of the liquid paste in the presence of copolymer 1 according to the invention compared with Ethacryl M. The liquid paste is much more fluid using copolymer 1. In the gray region "of common spreadings", the reduction in dosage, in comparison with Ethacryl M, varies from 40 to 100% for a spreading from 60 to 80 mm.

With this W/P ratio of 0.46, the effectiveness of Ethacryl M tends to reach a ceiling (spreading of less than 100 mm), whereas copolymer 1 according to the invention, by virtue of its greater water-reducing power, makes it possible to achieve much higher spreading values (greater than 120 mm).

Example 10

Quantification of the Copolymer 2, PNS and PCP Requirement in Order to Fluidize a Paste of a Retarded Foamed Plaster Exhibiting an Unvarying Proportion of Water The quantification of the copolymer 2 and commercial water-reducing agent, i.e. polynaphthalenesulfonate (PNS Chrysogypflu Ca from Chryso) or Ethacryl M (supplied by Lyondell), requirement in order to fluidize a retarded foamed plaster paste is carried out by means of different formulated plaster pastes, the copolymer 2 or commercial water-reducing agent content of which is adjusted so as to obtain an equivalent paste fluidity. The indicator used to quantify the copolymer 2 or commercial water-reducing agent requirement is respectively the weight of copolymer 2 or of commercial water-reducing agent present in the paste divided by the amount of plaster present in the paste.

The retarded foamed plaster paste comprises the following components:
  Synthetic plaster obtained from the Lafarge factory at Lippendorf;
  Water;
  A setting regulator solution such that the setting of the plaster is retarded by at least 1 hour;
  A solution of water-reducing agent (copolymer 2, PNS or Ethacryl M), the solids content of which can vary so as to obtain an unvarying paste fluidity;
  A foam prepared from air and a foaming agent solution.

The foam introduced into the retarded paste is manufactured in a bead bed foam generator from the abovementioned components. The generator is chosen so that, for an air flow rate of 450 ml/min and a foaming agent solution flow rate of 70 g/min, the flow rate of foam obtained is 478 ml/min.

The retarded foamed paste is obtained by the continuous introduction of each component into a continuous mixer conventionally used by a person skilled in the art. The mixer is generally composed of a cylindrical chamber inside which rotates a high-speed rotor, the operating conditions of which are kept constant from one test to the other. The feeding of the constituents takes place via the top cover of the mixer according to the following flow rates:
  Plaster of synthetic origin: 600 g/min
  Water: 250 g/min for the test with copolymer 2 and 220 g/min for the test with the PCP
  Setting regulator solution: 70 g/min
  Water-reducing agent solution: 40 g/min for the test with copolymer 2 and 70 g/min for the test with Ethacryl M
  Foam: 478 ml/min The paste is withdrawn via a pipe connected to the side wall of the mixer.

The fluidity of the retarded foamed paste is evaluated using the "spreading ring" test. The cylinder (also known as spreading ring) of well defined size (width 30 mm-height 50 mm) is positioned on the worktop, so that the volume delimited by the interior of the cylinder and the worktop forms a cavity. This cavity is completely filled with test retarded foamed paste, which paste is withdrawn at the outlet of a continuous mixer. The cylinder is then carefully raised. The test retarded foamed paste then spreads out over the worktop. The diameter of the disc formed by the test retarded foamed paste on the worktop is determined.

The retarded foamed paste obtained by the protocol described above exhibits the following qualities:
  A water/plaster ratio by weight of approximately 0.72;
  A spreading diameter of 200 mm or 170 mm;
  A density of approximately 1 g/cm$^3$ or 0.72 g/cm$^3$.

In order to achieve such a quality of paste, the solids contents of the solutions of water-reducing agents have to be adjusted so as to take into account their respective fluidizing powers.

Two experiments were carried out while successively using copolymer 2, PNS and Ethacryl M as water-reducing agent; the results are presented below:

|  | Dosage (% as dry matter) | Spreading in mm |
|---|---|---|
| Copolymer 2 | 0.027 | 170 |
| Copolymer 2 | 0.042 | 200 |
| PNS | 0.145 | 170 |
| Ethacryl | 0.143 | 200 |

For a spreading of 170 mm, the indicator of water-reducing agent requirement is 0.027% in the case of copolymer 2 and 0.145% in the case of PNS, showing that copolymer 2 exhibits a significantly greater effectiveness than that of PNS.

For a spreading of 200 mm, the indicator of water-reducing agent requirement is 0.042% in the case of copolymer 2 and 0.143% in the case of Ethacryl M, showing that copolymer 2 exhibits a significantly greater effectiveness than that of Ethacryl M.

Example 11

Comparison of the Evaluation of the Fluidizing Power of Copolymer 2 and of a PNS in Order to Fluidize a Paste of a Retarded Foamed Plaster The evaluation of the fluidizing power of copolymer 2 and of a polynaphthalene sulfonate (PNS Chrysogypflu Ca from Chryso) in order to fluidize a retarded foamed plaster paste is carried out using different formulated plaster pastes, the water content of which is adjusted so as to obtain an equivalent paste fluidity. The indicator used to quantify the fluidizing power of copolymer 2 or of PNS is the ratio of the weight of water to the weight of plaster present in the paste.

The retarded foamed plaster paste is the result of the homogeneous mixing of several components:
  Synthetic plaster obtained from the Lafarge factory at Lippendorf
  Water
  A setting regulator solution such that the setting of the plaster is retarded by at least 1 hour
  A solution of water-reducing agent based on copolymer 2 or on PNS with a solids content of 1.24%
  A foam prepared from air and a foaming agent solution, the concentration of foaming agent in the solution being at least equal to the critical micelle concentration of the product used.

The foam introduced into the retarded paste is manufactured in a static bead bed foam generator from the abovementioned compounds. The generator is chosen so that, for an air flow rate of 450 ml/min and a foaming agent solution flow rate of 70 g/min, the flow rate of foam obtained is 478 ml/min.

The retarded foamed paste is obtained by the continuous introduction of each component into a continuous mixer conventionally used by a person skilled in the art. The mixer is generally composed of a cylindrical chamber inside which rotates a high-speed rotor, the operating conditions of which are kept constant from one test to the other. The feeding of the components takes place via the top cover of the mixer according to the following flow rates:

Plaster of synthetic origin: 600 g/min
Water: variable flow rate
Setting regulator solution: 70 g/min
Water-reducing agent solution: 70 g/min
Foam: 478 ml/min The paste is withdrawn via a pipe connected to the side wall of the mixer.

The fluidity of the retarded foamed paste is evaluated using the "spreading ring" test. The cylinder (also known as spreading ring) of well defined size (width 30 mm-height 50 mm) is positioned on the worktop, so that the volume delimited by the interior of the cylinder and the worktop forms a cavity. This cavity is completely filled with test retarded foamed paste, which paste is withdrawn at the outlet of a continuous mixer. The cylinder is then carefully raised. The test retarded foamed paste then spreads out over the worktop. The diameter of the disc formed by the test retarded foamed paste on the worktop is determined.

The retarded foamed paste obtained by the protocol described above exhibits the following qualities:
A water-reducing agent/plaster ratio by weight of approximately
A spreading diameter of 200 mm;
A density of approximately 0.72 g/cm³.

In order to achieve such a quality of retarded foamed paste, its content has to be adjusted so as to take into account the respective fluidizing powers of copolymer 2 and of PNS. Two experiments were carried out while successively using copolymer 2 and PNS as water-reducing agent. The results are presented in the table below:

|  | W/P (Water/Plaster) ratio | Dosage (% as dry matter) | Spreading in mm |
|---|---|---|---|
| Copolymer 2 | 0.5 | 0.014 | 200 |
| PNS | 0.72 | 0.014 | 200 |

In the case of copolymer 2 and PNS, the water/plaster ratio by weight of the retarded foamed paste is 0.5 and 0.72 respectively, showing that copolymer 2 exhibits a significantly greater effectiveness than that of PNS.

Example 12

Evaluation of the Fluidizing Power of Copolymer 2 on Liquid Calcium Carbonate or Gypsum Paste The fluidity of the liquid paste is evaluated in the same way as above in example 6 but with a Schmitt ring with a width of 60 mm and a height of 50 mm.

The tests are carried out with copolymer 2 (proportion of active material given in the table below) with a water to solid ratio of W/S=0.5, the solid fraction being successively calcium carbonate (Durcal 1 and Durcal 10) and gypsum (synthetic FGD gypsum, 0-63 µm and 100-200 µm fractions). The results are presented in the table below:

|  | Dosage of active material of polymer 2 | |
|---|---|---|
| Solid fraction | 0% | 0.1% |
| Durcal 1 | 83 | 175 |
| Durcal 10 | 233 | 310 |
| Gypsum 0-63 µm | 210 | 300 |
| Gypsum 100-200 µm | 185 | Strong sedimentation |

What is claimed is:

1. A method comprising:
adding at least one copolymer, or one of its salts, acting as a water-reducing agent to a hydraulic binder based on calcium sulfate chosen from a plaster based on calcium sulfate hemihydrate (α or β or a mixture of the two) or a binder based on anhydrous calcium sulfate, said copolymer comprising at least one unit of formula (I):

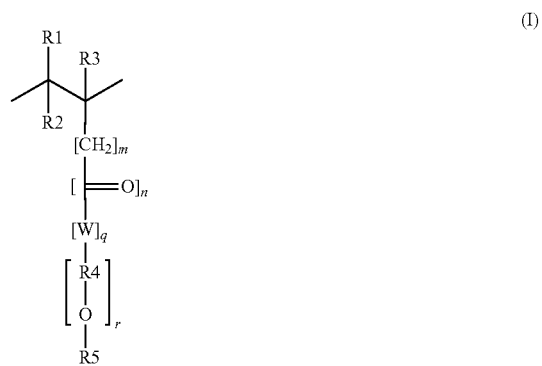

and said copolymer comprising at least one unit of formula (II):

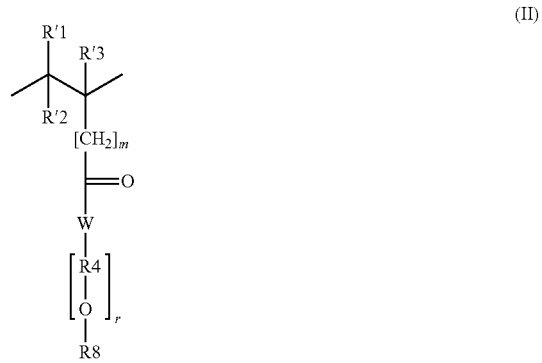

in which:
R1, R2 and R3 independently represent a hydrogen atom, a linear or branched $C_1$ to $C_{20}$ alkyl radical or a phenyl radical;
R'1, R'2 and R'3 independently represent a hydrogen atom, a linear or branched $C_1$ to $C_{20}$ alkyl radical, a phenyl radical or a —COOR9 radical with R9 independently representing a hydrogen atom, a linear or branched $C_1$ to $C_4$ alkyl radical, a monovalent, divalent or trivalent ion or a quaternary ammonium radical;
R4 represents a linear or branched $C_2$ to $C_{20}$ alkyl radical;
R5 represents a radical of formula:

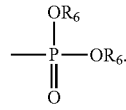

R6 independently represents a hydrogen atom, a linear or branched $C_1$ to $C_{20}$ alkyl radical, a monovalent, divalent or trivalent ion or a quaternary ammonium radical;

or also R5 represents a radical of formula:

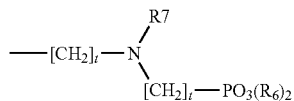

R7 represents a hydrogen atom, a linear or branched $C_1$ to $C_{18}$ alkyl radical or a radical of formula:

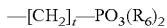

R8 represents a hydrogen atom or a linear or branched $C_1$ to $C_{20}$ alkyl radical;
W independently represents an oxygen or a nitrogen atom or an NH radical;
m is an integer from 0 to 2;
n is an integer equal to 0 or 1;
q is an integer equal to 0 or 1;
r is an integer from 20 to 250;
t is an integer from 0 to 18;
and said copolymer comprising at least one unit of formula (III) originating from a monomer chosen from:
unsaturated monomers of monocarboxylic or dicarboxylic acids, comprising acrylic acid, methacrylic acid, maleic acid, maleic anhydride, fumaric acid, itaconic acid, itaconic anhydride or citraconic acid, and their salts of monovalent or divalent metals, quaternary ammonium or organic amines;
esters and diesters of the abovementioned unsaturated monomers of monocarboxylic or dicarboxylic acid having an alcohol functional group having from 1 to 30 carbon atoms;
amides and diamides of the abovementioned unsaturated monomers of monocarboxylic or dicarboxylic acid having an amine functional group having from 1 to 30 carbon atoms;
esters and diesters of the abovementioned unsaturated monomers of monocarboxylic or dicarboxylic acid having an alkoxy (poly(alkylene glycol)s) functional group obtained by addition of from 1 to 500 mol of alkylene oxide having from 2 to 18 carbon atoms to the abovementioned alcohols and amines;
esters and diesters of the abovementioned unsaturated monomers of monocarboxylic or dicarboxylic acid having a glycol functional group possessing from 2 to 18 carbon atoms or possessing from 2 to 500 poly (alkylene glycol)s as molar addition number of the preceding glycols;
unsaturated sulfonic acids, comprising vinylsulfonate, (meth)allylsulfonate, 2-(meth)acryloxyethylsulfonate, 3-(meth)acryloxypropylsulfonate, 3-(meth)acryloxy-2-hydroxypropylsulfonate, 3-(meth)acryloxy-2-hydroxypropyl sulfophenyl ether, 3-(meth) acryloxy-2-hydroxypropyloxysulfobenzoate, 4-(meth)acryloxybutylsulfonate, (meth)acrylamidomethylsulfonic acid, (meth)acrylamidoethylsulfonic acid, 2-methylpropanesulfonic acid (meth)acrylamide and styrenesulfonic acid, or their salts of monovalent or divalent metals, quaternary ammonium or organic amines;
vinylaromatic compounds, comprising styrene, α-methylstyrene, vinyltoluene and p-methylstyrene;
unsaturated amides, comprising (methyl)acrylamide, (methyl)acrylalkylamide, N-methylol(meth)acrylamide and N,N-dimethyl(meth)acrylamide;
unsaturated esters, comprising vinyl acetate and vinyl propionate;
unsaturated amines, comprising aminoethyl(meth)acrylate, methylaminoethyl(meth)acrylate, dimethylaminoethyl(meth)acrylate, dimethylaminopropyl(meth)acrylate, dibutylaminoethyl(meth)acrylate and vinylpyridine;
for which the molar mass of said copolymer is from 15 000 to 250 000 daltons,
said copolymer not comprising crosslinking units,
and said copolymer comprising:
from 20 to 80% of units (I);
from 5 to 35% of units (II);
from 20 to 60% of unit (III);
the percentages being expressed as number of unit entities with respect to the total number of units present in the copolymer.

2. The method as claimed in claim 1, wherein said copolymer has an R5 radical representing a radical of formula:

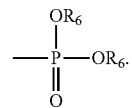

3. The method as claimed in claim 1, wherein said copolymer comprises approximately 40% of units of formula (III).

4. The method as claimed in claim 1, wherein said copolymer has an R8 radical representing a hydrogen atom or a methyl radical.

5. The method as claimed in claim 1, wherein W represents an oxygen atom.

6. A hydraulic binder, comprising at least one copolymer or one of its salts as claimed in claim 1.

7. A method comprising manufacturing a unit for the field of construction using a hydraulic binder as claimed in claim 6.

8. A unit for the field of construction, obtained from a hydraulic binder comprising at least one copolymer or one of its salts as claimed in claim 1.

9. A method comprising:
adding at least one copolymer, or one of its salts, acting as a water-reducing agent to a hydraulic binder based on calcium sulfate chosen from a plaster based on calcium sulfate hemihydrate (α or β or a mixture of the two) or a binder based on anhydrous calcium sulfate, said copolymer comprising at least one unit of formula (I):

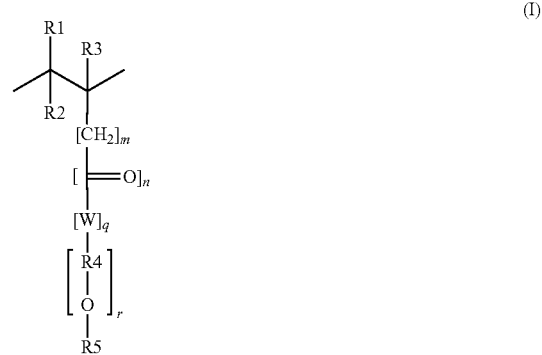

and said copolymer comprising at least one unit of formula (II):

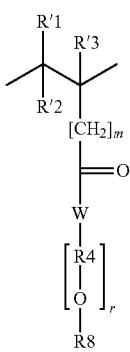

(II)

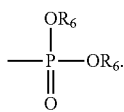

in which:
R1, R2 and R3 independently represent a hydrogen atom, a linear or branched $C_1$ to $C_{20}$ alkyl radical or a phenyl radical;
R'1, R'2 and R'3 independently represent a hydrogen atom, a linear or branched $C_1$ to $C_{20}$ alkyl radical, a phenyl radical or a —COOR9 radical with R9 independently representing a hydrogen atom, a linear or branched $C_1$ to $C_4$ alkyl radical, a monovalent, divalent or trivalent ion or a quaternary ammonium radical;
R4 represents a linear or branched $C_2$ to $C_{20}$ alkyl radical;
R5 represents a radical of formula:

$$\begin{array}{c} OR_6 \\ | \\ -P-OR_6. \\ \| \\ O \end{array}$$

R6 independently represents a hydrogen atom, a linear or branched $C_1$ to $C_{20}$ alkyl radical, a monovalent, divalent or trivalent ion or a quaternary ammonium radical;
or also R5 represents a radical of formula:

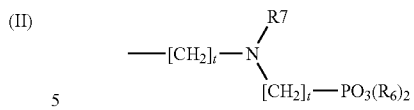

R7 represents a hydrogen atom, a linear or branched $C_1$ to $C_{18}$ alkyl radical or a radical of formula:
—[CH$_2$]$_t$—PO$_3$(R$_6$)$_2$
R8 represents a hydrogen atom or a linear or branched $C_1$ to $C_{20}$ alkyl radical;
W independently represents an oxygen or a nitrogen atom or an NH radical;
m is an integer from 0 to 2;
n is an integer equal to 0 or 1;
q is an integer equal to 0 or 1;
r is an integer from 20 to 250
t is an integer from 0 to 18;
and said copolymer comprising at least one unit of formula (III) selected from unsaturated carboxylic acids including:
unsaturated monomers of monocarboxylic or dicarboxylic acid selected from the group consisting of acrylic acid, methacrylic acid, maleic acid, maleic anhydride, fumaric acid, itaconic acid, itaconic anhydride or citraconic acid, and their salts of monovalent or divalent metals, quaternary ammonium or organic amines for which a molar mass of said copolymer is from 15000 to 250000 daltons, said copolymer not comprising crosslinking entities having at least two functional groups which have polymerized to result in crosslinking of polymer chains;
and said copolymer comprising:
from 20% to 80% of units (I);
from 5% to 35% of units (II);
from 20% to 60% of unit (III);
the percentages being expressed as number of unit entities with respect to the total number of units present in the copolymer.

* * * * *